United States Patent
Ishige et al.

[11] Patent Number: 5,901,031
[45] Date of Patent: May 4, 1999

[54] VARIABLE CAPACITOR

[75] Inventors: Tsutomu Ishige, Komatsu; Yasuhiro Negoro, Yokohama; Yuji Iyoda; Yasutaka Fujii, both of Sagamihara; Katsuhiko Tanaka, Ibaraki, all of Japan

[73] Assignee: Murata Manufacturing Co., Ltd., Japan

[21] Appl. No.: 08/594,771

[22] Filed: Jan. 31, 1996

[30] Foreign Application Priority Data

| Feb. 1, 1995 | [JP] | Japan | 7-036188 |
| Jun. 12, 1995 | [JP] | Japan | 7-169187 |
| Jan. 17, 1996 | [JP] | Japan | 8-023274 |

[51] Int. Cl.$^6$ .................................................. H01G 5/00
[52] U.S. Cl. ........................ 361/277; 361/278; 361/281
[58] Field of Search ..................... 257/595, 600, 257/602; 361/280–281, 283.3, 283.4; 73/715, 718, 724

[56] References Cited

U.S. PATENT DOCUMENTS

| 2,368,643 | 2/1945 | Crosby | 361/281 |
| 4,196,632 | 4/1980 | Sikorra | 73/718 |
| 5,168,249 | 12/1992 | Larson | 333/81 |
| 5,175,521 | 12/1992 | Larson | 333/235 |
| 5,228,341 | 7/1993 | Tsuchitani et al. | 73/517 R |
| 5,367,429 | 11/1994 | Tsuchitani et al. | 361/283.1 |

FOREIGN PATENT DOCUMENTS

| 2128769 | 1/1995 | Canada . |
| 0387518 | 9/1990 | European Pat. Off. . |
| 5-74655 | 3/1993 | Japan . |
| 9203740 | 3/1992 | WIPO . |

OTHER PUBLICATIONS

Patent Abstracts of Japan, vol. 17, No. 112 (P/1498), Mar. 8, 1993 & JP 04 299267 A (Abstract).
Patent Abstracts of Japan, vol. 17, No. 398 (E–1403), Jul. 26, 1993 & JP 05 074655 A (Abstract).

*Primary Examiner*—Kristine Kincaid
*Assistant Examiner*—Anthony Dinkins
*Attorney, Agent, or Firm*—Ostrolenk, Faber, Gerb & Soffen, LLP

[57] ABSTRACT

A reference electrode is fixed on the bottom of a concave portion of a substrate. A movable electrode is provided so that its electrode face faces that of the reference electrode at an interval to form a capacitor by the movable and reference electrodes. A driving electrode for driving the movable electrode is fixed on the substrate at an interval from the movable electrode. The distance 2L between the driving and movable electrodes is twice the distance L between the movable and reference electrodes. An external bias voltage is applied between the driving and movable electrodes to deflect the movable electrode. This doubles the range of the displacement of the movable electrode, thereby increasing the capacity change rate of the variable capacitor.

10 Claims, 9 Drawing Sheets

DISTANCE BETWEEN MOVABLE ELECTRODE AND REFERENCE
ELECTRODE DIVIDED BY DISTANCE BETWEEN MOVABLE
ELECTRODE AND DRIVING ELECTRODE

VARIABLE CAPACITOR

BACKGROUND OF THE INVENTION

1. Field of the Invention

The present invention relates to a variable capacitor used as a voltage capacity conversion device.

2. Description of the Related Art

Figure 18:
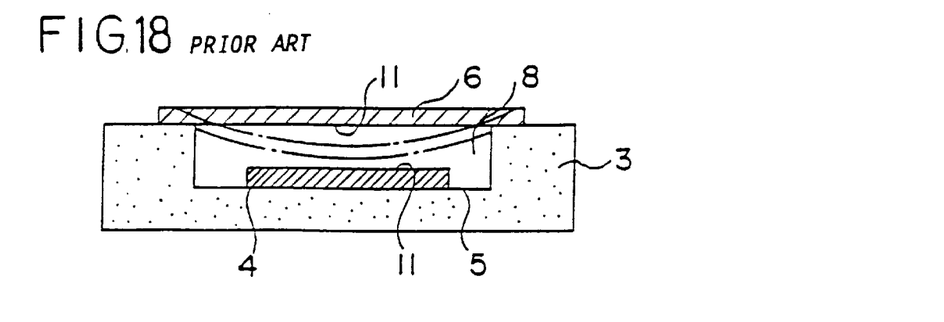
FIG. 18 is a vertical sectional view of an example of a conventional variable capacitor.

FIG. 18 shows the configuration of a major part of a variable capacitor proposed in Japanese unexamined patent publication No. H5-74655 as an example of a variable capacitor. This variable capacitor is formed using a surface micromachining technique. In FIG. 18, a concave portion 8 is formed in a substrate 3 made of silicon, and a thin film reference electrode 4, which has been formed by means of aluminum deposition or the like, is fixed to the substrate 3 in the middle of the bottom 5 of the concave portion 8. A movable electrode 6 having an electrode face 11 facing an electrode face 11 of the reference electrode 4 is formed on the upper end of the concave portion 8 and is fixed to both ends of the opening of the concave portion so that it stretches across the opening. A capacitor is formed by the movable electrode 6 and the reference electrode 4. Like the reference electrode 4, the movable electrode 6 a thin film is formed by means of aluminum deposition or the like.

Figure 19:
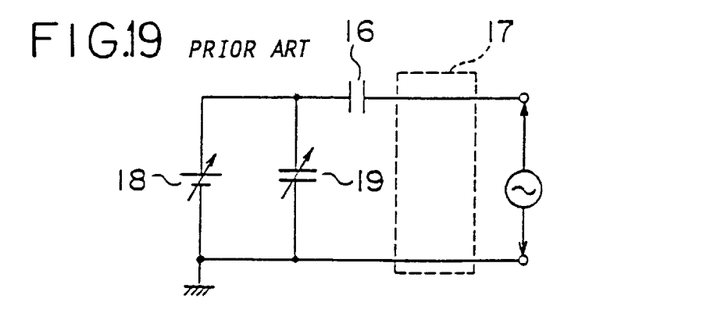
FIG. 19 illustrates an example of a circuit configuration employing a conventional variable capacitor.

FIG. 19 shows an equivalent circuit for this variable capacitor. In FIG. 19, a bias voltage source 18 is connected to a capacitor 19 formed by the reference electrode 4 and movable electrode 6 to apply a DC bias voltage thereto. This voltage is applied between terminal portions (not shown) leading from one end of each of the electrodes 4 and 6 to produce a potential difference between the electrodes 4 and 6.

As shown in FIG. 18 when the bias voltage source 18 applies the external bias voltage between the reference electrode 4 and movable electrode 6 to produce a potential difference between the electrodes 4 and 6, the movable electrode 6 is deflected toward the reference electrode 4 by the action of a Coulomb force (electrostatic force) to the position indicated in phantom FIG. 18. This results in a change in the electrode spacing (the gap) between the movable electrode 6 and reference electrode 4. As a result, there is provided a variable capacitor whose electrostatic capacity changes in accordance with the external bias voltage applied between the movable electrode 6 and reference electrode 4.

As shown in FIG. 19, a cut-off capacitor 16 is normally provided in a circuit using such a variable capacitor to eliminate DC components from the bias voltage source 18. For example, this prevents various circuits such as an oscillation circuit provided in the area 17 indicated by the broken line in FIG. 19 from being adversely affected by the DC components from the bias voltage source 18.

A variable capacitor according to this proposal is constituted by a single element. Therefore, it is advantageous in that it can be made small in size and fabricated simply unlike a conventional variable air capacitor which require complicated mechanisms such as a rotating mechanism for varying the electrostatic capacity (for example, by mechanically rotating a screw to increase and decrease the area in which the electrodes face each other). Further, unlike a varactor diode, there is no decrease in the Q-value due to an increase in the internal resistance introduced in an attempt to improve the withstand voltage. Thus, this capacitor is attracting much attention as an excellent variable capacitor having high withstand voltage and Q-value.

However, in a variable capacitor according to the above-described proposal, the displacement of the movable electrode 6 is limited by the relationship between the Coulomb force applied to the movable electrode 6 and the spring force produced in the movable electrode 6 when it is deflected by the Coulomb force. This has resulted in a problem in that it is not easy to increase the rate of the capacity change achieved by the deflection of the movable electrode 6.

The reason is that the above-described spring force and Coulomb force are not easily balanced when the amount of the displacement of the movable electrode 6 exceeds one-third of the distance between the reference electrode 4 and movable electrode 6.

A description will now be made on the relationship between the amount of the displacement of the movable electrode 6 and the Coulomb and spring forces exerted on the movable electrode 6. The movable electrode 6 will fix itself in a position where equilibrium is reached between the Coulomb force exerted on the movable electrode 6 due to the potential difference between the movable electrode 6 and reference electrode 4 on the one hand and the spring force of the moveable electrode 6 that tends to return the movable electrode 6 to the initial undeflected position when the movable electrode 6 is deflected by the Coulomb force on the other. This relationship is expressed by the following equation:

$$F = kx = \tfrac{1}{2} \cdot \epsilon S \{V/(x_0 - x)\}^2 \qquad \text{Equation 1}$$

where k represents the spring constant of the movable electrode 6; S represents the area of the movable electrode 6 that faces the reference electrode 4; $\epsilon$ represents a dielectric constant; V represents the potential difference between the electrodes 4 and 6; $x_0$ represents the distance between the electrodes 4 and 6; and x represents the amount of the displacement of the movable electrode 6. Equation 1 can be transformed into the following Equation 2 if we put $u = x/x_0$ and $K = \epsilon S / 2 k x_0^3$:

$$u(1-u)^2 = KV^2 \qquad \text{Equation 2}$$

Figure 20:
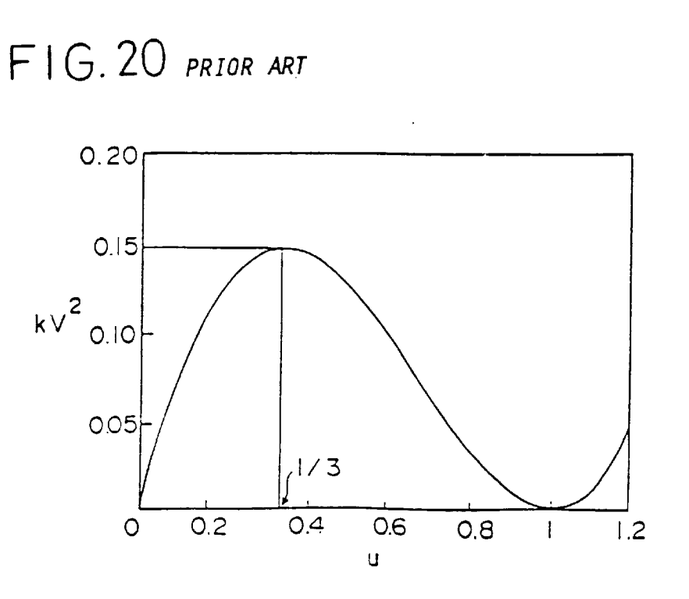
FIG. 20 is a graph showing the relationship between the displacement rate and spring force of the conventional variable capacitor shown in FIG. 13.

The relationship as shown in FIG. 20 is derived from Equation 2 if we put $u(1-u)^2 = f(u)$. The function $f(u)$ is a cubic function wherein $KV^2$ peaks at about 0.15 when $u = \tfrac{1}{3}$. FIG. 20 shows that the spring force and Coulomb force become unbalanced when the bias voltage V increases causing u to exceed $\tfrac{1}{3}$. When this happens, the movable electrode 6 can contact the reference electrode 4. Although the spring force and Coulomb force can be balanced with u exceeding $\tfrac{1}{3}$, some measures must be taken to control the bias voltage V depending on the spring force.

Therefore, the practical range of the displacement of the movable electrode 6 is limited to one-third the distance between the movable electrode 6 and reference electrode 4. This has limited the maximum capacity change rate of this variable capacitor to 50%, and it has not been possible to increase the varying rate further.

SUMMARY OF THE INVENTION

The present invention has been conceived to solve the above-described problem, and it is an object of the present invention to provide a variable capacitor wherein a high varying rate (capacity change rate) can be achieved.

In order to solve the above-described problem, according to the present invention, there is provided a variable capacitor including:

a substrate;

a capacitor formed by a movable electrode and a reference electrode respectively supported on the substrate so that they face each other at an interval; and a driving electrode supported on the substrate so that it faces the movable electrode at an interval for driving the movable electrode by applying a bias voltage to produce a potential difference between the movable electrode and itself.

According to the present invention having the above-described configuration, since the movable electrode is driven by the driving electrode, the range of the displacement of the movable electrode depends on the distance between the movable and driving electrodes and does not depend on the distance between the movable electrode and the reference electrode. Therefore, the range of the displacement of the movable electrode can be increased by increasing the distance between the driving and movable electrodes, thereby increasing the varying rate of the capacitor formed by the movable and reference electrodes (capacity change rate). Conversely, if the distance between the movable and driving electrodes is decreased, although the range of the displacement of the movable electrode is decreased, the driving voltage applied to drive the movable electrode (external bias voltage) can be reduced. Thus, it is possible to vary the capacity of the capacitor by displacing the movable electrode using a low voltage.

Other features and advantages of the present invention will become apparent from the following description of the invention which refers to the accompanying drawings.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

FIG. 4($a$) is a plan view of a major part of a second embodiment of a variable capacitor according to the present invention.

FIG. 4($b$) is a cross sectional view of the portion of the second embodiment of the variable capacitor taken along lines 4($b$)—4($b$) of FIG. 4($a$).

FIG. 5($a$) is a plan view of a major part of a third embodiment of a variable capacitor according to the present invention.

FIG. 5($b$) is a cross sectional view of the embodiment of FIG. 5($a$) taken along the lines 5($b$)—5($b$).

FIG. 8($a$) shows the position of the movable electrode relative to the reference electrode of the fourth embodiment before a potential is applied across the movable and driving electrodes.

FIG. 8($b$) shows the position of the movable electrode relative to the reference electrode of the fourth embodiment after a potential has been applied across the movable and driving electrodes.

FIG. 14($a$) is a plan view of a major part of a ninth embodiment of a variable capacitor according to the present invention.

FIG. 14($b$) is a sectional view of a major part of the ninth embodiment of a variable capacitor according to the present invention taken along lines 14($b$)—14($b$) of FIG. 14($a$).

DETAILED DESCRIPTION OF THE PREFERRED EMBODIMENTS

Preferred embodiments of the present invention will now be described with reference to the accompanying drawings. In the description of the embodiments, components having designations similar to those in the prior art are indicated by like reference numbers and are not described to avoid duplication.

(a) First Embodiment

Figure 1:
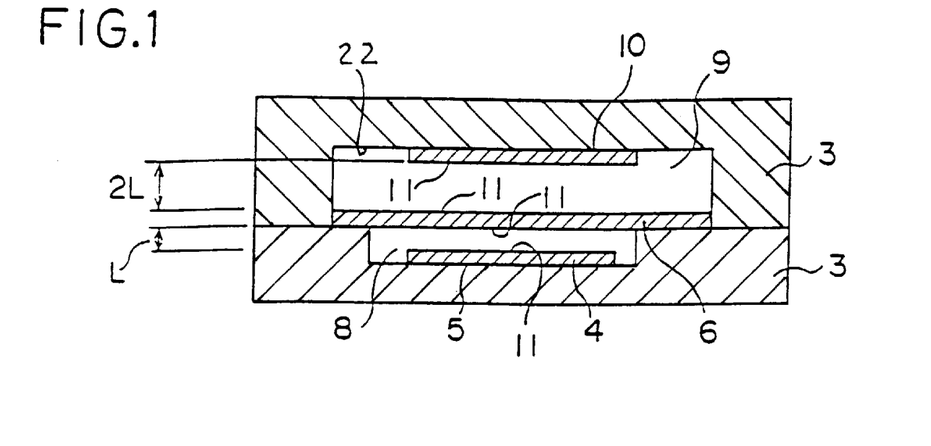
FIG. 1 is a sectional view of a major part of a first embodiment of a variable capacitor according to the present invention.

FIG. 1 is a sectional view showing the configuration of a major part of a first embodiment of a variable capacitor according to the present invention. In this embodiment, a driving electrode 10 is supported by a substrate 3 (which is divided into top and bottom sections) at location spaced from the top side of the movable electrode 6. The driving electrode 10 is fixed on a bottom 22 of a concave portion 9 of the substrate 3, and the distance between the driving electrode 10 and the movable electrode 6 is 2L, which is preferably the twice the distance L between the movable electrode 6 and a reference electrode 4.

The movable electrode 6, reference electrode 4, and the driving electrode 10 are preferably formed of aluminum by means of aluminum deposition or the like. An insulation film (not shown) is preferably formed on the surface of the electrode faces 11 of the electrodes 4, 6, and 10 to prevent shorting even if those electrode faces 11 contact each other as a result of deflection of the movable electrode 6. Respective terminal portions (not shown) are led out from the electrodes 6 and 10, and a voltage is applied between those terminal portions from a bias voltage source 18 as shown schematically in FIG. 2.

Figure 2:
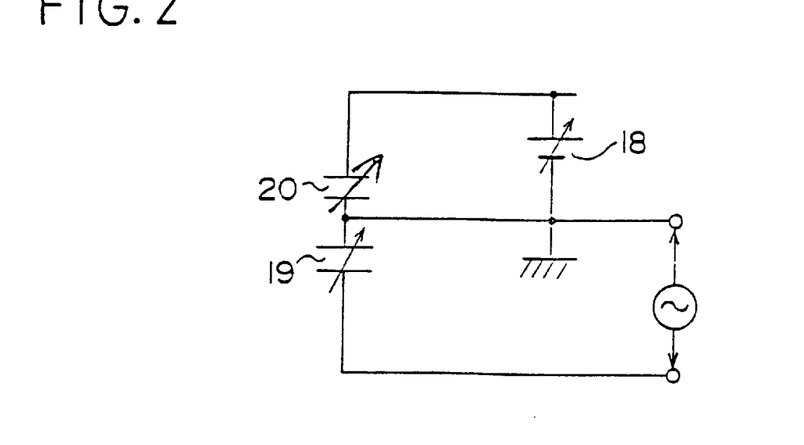
FIG. 2 is an equivalent circuit diagram showing an example of a circuit configuration employing the variable capacitor of the first embodiment of the invention.

FIG. 2 shows an equivalent circuit as an example of a circuit configuration employing the variable capacitor of FIG. 1. As shown in FIG. 2, a bias voltage from the bias voltage source 18 is applied to a capacitor 20 formed by the driving electrode 10 and movable electrode 6.

When a bias voltage is applied to the driving electrode 10 and movable electrode 6 by the bias voltage source 18 to produce a potential difference between the driving electrode 10 and movable electrode 6, the distance between the driving electrode 10 and movable electrode 6 changes as a result of the deflection of the movable electrode 6 toward the driving electrode 10.

Figure 3:
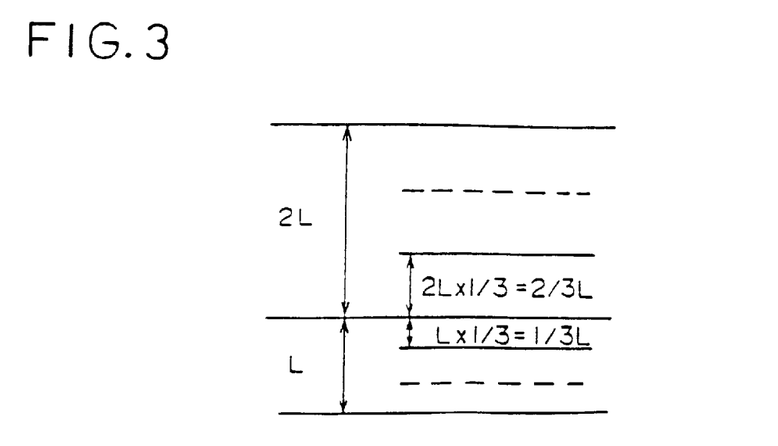
FIG. 3 illustrates the range of the displacement of the movable electrode of the first embodiment in comparison with the range of the displacement of a conventional movable electrode.

The range of the displacement of the movable electrode 6 depends on the distance between the movable electrode 6 and driving electrode 10. According to the relationship illustrated in FIG. 8, the movable electrode 6 can be displaced up to one-third the distance 2L between the driving electrode 10 and movable electrode 6 (compare FIGS. 8(a) and 8(b)). Therefore, as shown in FIG. 3, the range of the displacement of the movable electrode 6 according to the present embodiment is ⅔ L which is twice the range of the displacement of a conventional movable electrode 6 (⅓ L).

When the movable electrode 6 is displaced toward the driving electrode 10, the distance between the movable electrode 6 and reference electrode 4 also changes. The electrostatic capacity across the movable electrode 6 and reference electrode 4 changes in accordance with the amount of the displacement of the movable electrode 6. Therefore, there is provided a variable capacitor which operates (whose capacitance varies) in response to the bias voltage applied between the driving electrode 10 and movable electrode 6.

As described above, the range of the displacement of the movable electrode 6 according to the present embodiment can be twice that of the prior art. This makes it possible to vary the distance between the movable electrode 6 and reference electrode 4 greatly and, therefor, to increase the capacity change rate of the variable capacitor which depends on the distance between the movable electrode 6 and reference electrode 4.

Like the variable capacitor shown in FIG. 18, the variable capacitor of the present embodiment can be easily fabricated using semiconductor fabrication techniques such as surface micromachining. Therefore, it can be made compact and fabricated at a low cost.

Further, according to the present embodiment, the capacitor 20 can play the roll of the cut-off capacitor 16 which is required in a conventional circuit (see FIG. 19) if this variable capacitor is used in the circuit configuration as shown in FIG. 2. This makes it possible to use a variable capacitor in a circuit configuration having no separate cut-off capacitor 16. As a result, a circuit configuration employing a variable capacitor can be simplified, which reduces the cost associated with the use of a variable capacitor.

(b) Second Embodiment

Figures 4A, 4B:
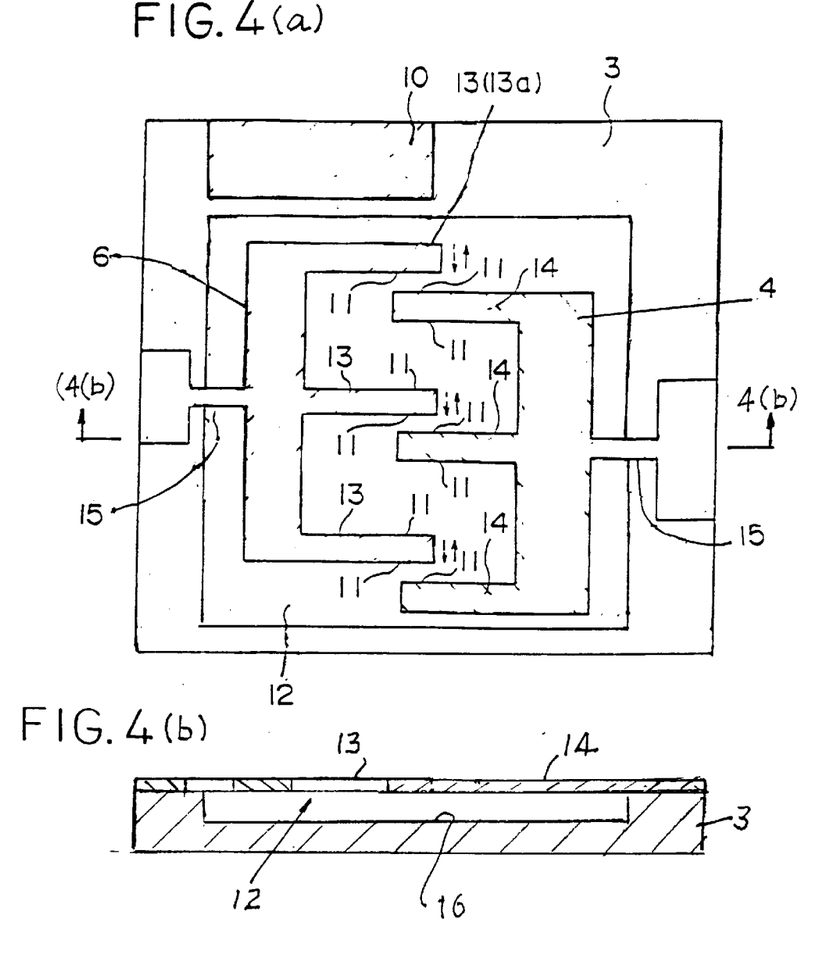

FIGS. 4(a) and 4(b) showing the configuration of a major part of a second embodiment of a variable capacitor according to the present invention (the top cover to the variable capacitor is omitted). In this embodiment, the movable electrode 6 and reference electrode 4 are provided in the form of interdigitated comb teeth which are alternated at intervals so that the electrode faces 11 thereof face each other.

The movable electrode 6 and reference electrode 4 are supported by a substrate 3 through a beam portion 15. The electrodes 4 and 6 are suspended over a concavity 12 and are both movable in this embodiment. As best shown in FIG. 4(b), the height of the reference electrode 4 and the movable electrode 6 above the bottom surface 16 of the concavity 12 is substantially equal. The electrode spacing between the comb teeth 13 (13a) of the movable electrode 6 and the driving electrode 10 is preferably greater than the electrode spacing between the electrode faces 11 of the comb teeth 13 of the movable electrode 6 and the electrode faces 11 of the comb teeth 14 of the reference electrode 4.

As in the first embodiment, the movable electrode 6 is driven by applying a bias voltage between the driving electrode 10 and movable electrode 6 to change the distance between the driving electrode 10 and the movable electrode 6 (the comb teeth 13 move in the direction of the arrows—up and down—in FIG. 4). As a result, the distance between the movable electrode 6 and reference electrode 4 also changes. This changes the electrostatic capacity across the movable electrode 6 and reference electrode 4, which results in a voltage capacity determined by the applied external bias voltage. Thus, the same advantage as in the first embodiment are provided.

(c) Third Embodiment

Figure 5A:
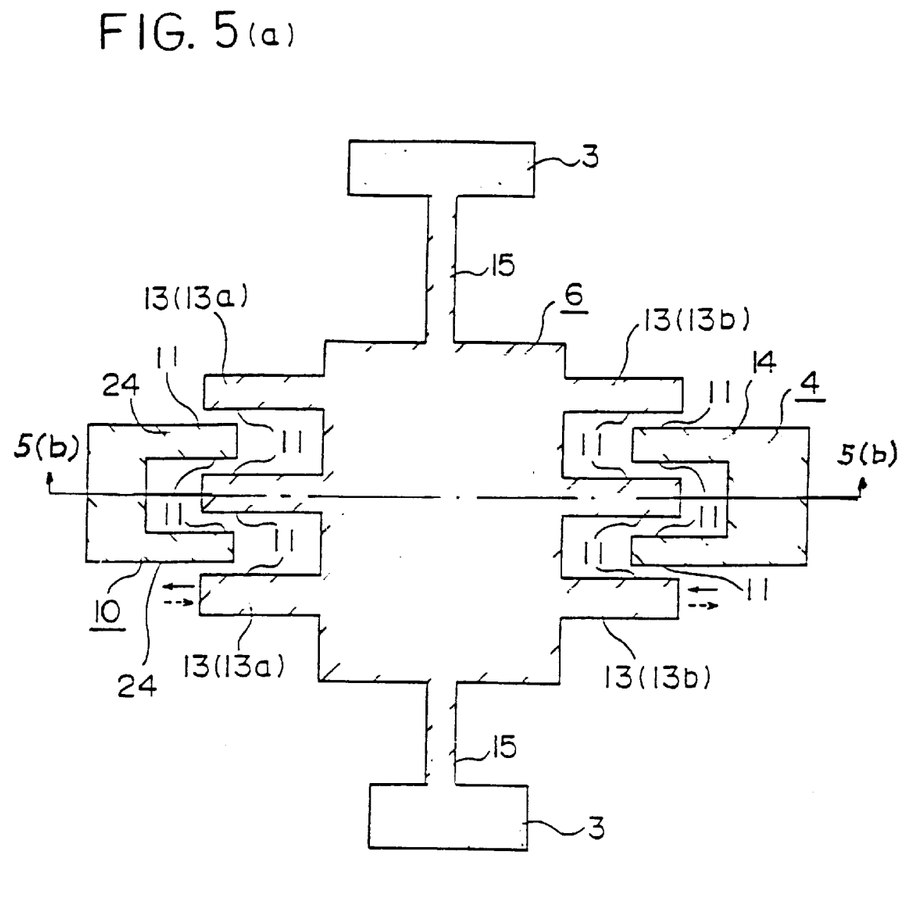
Figure 5B:
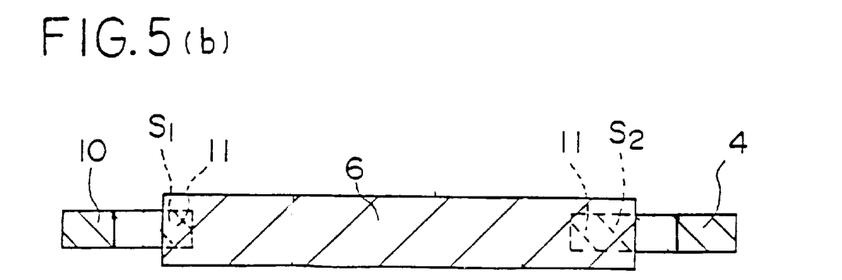

FIG. 5(a) is a plan view showing the configuration of a major part of a third embodiment of a variable capacitor according to the present invention. FIG. 5(b) is a sectional view taken along the line 5(b)—5(b) in FIG. 5(a). In this embodiment, the driving electrode 10 is provided in the form of comb teeth; the comb teeth 13a of the movable electrode 6 and comb teeth 14 of the driving electrode 4 are interdigitated so that the electrode faces 11 thereof face each other; and the movable electrode 6 can be moved by the driving electrode 10 in the direction of the arrows (to the left and right in FIG. 5(b)).

As shown in FIG. 5(b), the area $S_1$ where the comb teeth 13 (13a) overlap and face the driving electrode 10 is smaller than the area $S_2$ where the electrode faces 11 of the comb teeth 13 (13b) of the movable electrode 6 overlap and face the electrode faces 11 of the comb teeth 14 of the reference electrode 4 (the area of the region wherein the electrodes overlap with each other).

In the present embodiment, a bias voltage is applied between the driving electrode 10 and movable electrode 6 to drive the movable electrode 6 in the direction of the arrows. This results in a change in the area $S_2$ where the comb teeth 13b of the movable electrode 6 overlap and face the comb teeth 14 of the reference electrode 4 and, therefore, results in a change in the electrostatic capacity across the movable electrode 6 and reference electrode 4. This provides a voltage capacity determined by the applied external bias voltage. Thus, the same advantage as in the second embodiment is provided.

While the driving electrode 10 is provided on the opposite side of the movable electrode 6 from the reference electrode 4 in the above-described first, second, and third embodiments (FIGS. 1 through 5(b)), the driving electrode 10 may be provided on the same side of the driving electrode 10 as the reference electrode 4 as shown in fourth through ninth embodiments described below. This arrangement also allows the design of a variable capacitor to be more flexible than the design of the first, second, and third embodiments.

In order to obtain a high change rate of capacitance, for example, the distance between the movable electrode 6 and driving electrode 10 must be set at a value which is different from the distance between the movable electrode 6 and reference electrode 4.

(d) Fourth Embodiment

Figure 6:
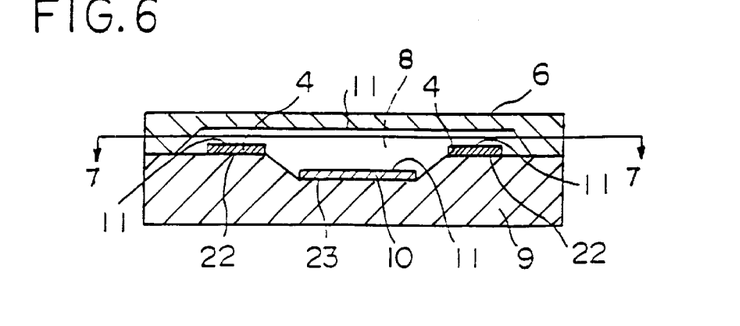
FIG. 6 is a vertical sectional view of a major part of a fourth embodiment of a variable capacitor according to the present invention.
Figure 7:
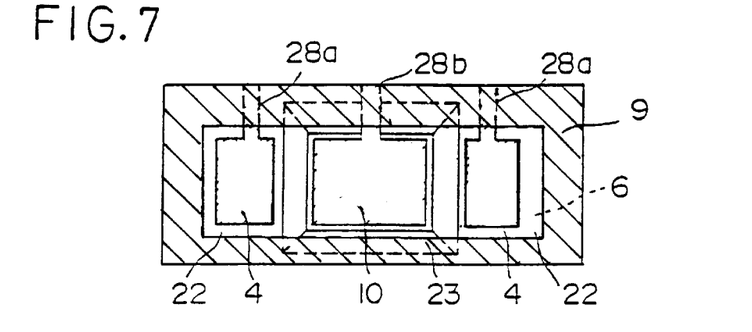
FIG. 7 is a horizontal sectional view of the variable capacitor of the fourth embodiment taken along lines 7—7 of FIG. 6.

FIG. 6 is a vertical sectional view showing the configuration of a major part of a fourth embodiment of a variable capacitor according to the present invention. FIG. 7 is a sectional view taken along the line 7—7 in FIG. 6. A driving electrode 10 and a pair of reference electrodes 4 are provided in the form of rectangular thin film on an insulating support base 9 preferably constructed of an insulator such as glass and ceramic. Further, a movable electrode 6 is disposed so as to face the driving electrode 10 and reference electrodes 4 with a gap 8 therebetween. A capacitor 19, as shown in FIG. 2, is formed by the movable electrode 6 and reference electrodes 4.

Figures 8A, 8B:
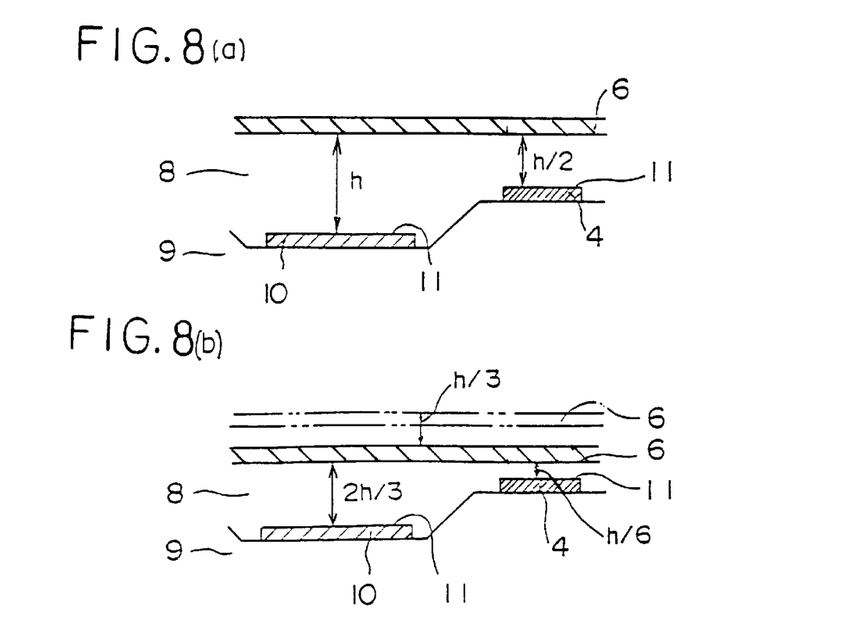

The movable electrode 6 is supported by the insulating support base 9 at both ends thereof, in a dual support beam configuration. The movable electrode 6 is preferably provided so that it is in the form of a flat sheet having no irregularity in the area where it faces the driving electrode 10 and reference electrodes 4. The insulating support base 9 has an irregularity on the surface thereof formed by a concave portion 23 extending from a flat portion 22. As a result, the gap between the movable electrode 6 and the driving electrode 10 is greater than the gap between the movable electrode 6 and reference electrodes 4. As shown in FIG. 8(*a*), the distance (h) between the movable electrode 6 and driving electrode 10 is preferably twice the distance (h/2) between the movable electrode 6 and reference electrodes 4.

In the present embodiment, the movable electrode 6, reference electrodes 4, and driving electrode 10 are all aluminum, and an insulation film is formed on the surface of an electrode face 11 of each of the electrodes 10, 4, and 6 to prevent shorting between the electrode faces 11 even when they contact each other as a result of displacement of the movable electrode 6. As shown in FIG. 7, terminal portions 28*b* and 28*a* are led out from the driving electrode 10 and reference electrodes 4, respectively; a terminal portion (not shown) is also led out from the movable electrode 6; and a voltage from a bias voltage source 18 (FIG. 2) is applied between the terminal portions of the movable electrode 6 and driving electrode 10.

In the present embodiment, a bias voltage from the bias voltage source 18 is again applied to a capacitor 20 formed by the driving electrode 10 and movable electrode 6.

In the present embodiment, when a bias voltage is applied to the driving electrode 10 and movable electrode 6 by the bias voltage source 18 to produce a potential difference between the electrodes 6 and 10, the movable electrode 6 is deflected toward the driving electrode 10 to change the distance between the driving electrode 10 and movable electrode 6 (and therefore between the movable electrode 6 and the reference electrode 4).

The range of the displacement of the movable electrode 6 depends on the distance between the movable electrode 6 and driving electrode 10, and the displacement of the movable electrode 6 can be as large as one-third the distance h between the movable electrode 6 and driving electrode 10. Therefore, as shown in FIG. 8(*b*), the range of the displacement of the movable electrode 6 available in the present embodiment is h/3 which is twice the range of the displacement (h/6) of a conventional movable electrode 6.

Such displacement of the movable electrode toward the driving electrode 10 simultaneously causes a change in the distance between the movable electrode 6 and reference electrodes 4. As a result, the electrostatic capacity across the movable electrode 6 and reference electrodes 4 changes in accordance with the amount of the displacement of the movable electrode 6. Thus, there is provided a variable capacitor which operates in accordance with a bias voltage applied between the driving electrode 10 and movable electrode 6.

According to the present embodiment, the range of the displacement of the movable electrode 6 can be twice that available in the prior art, which allows the distance between the movable electrode 6 and reference electrodes 4 to be varied greatly. It is therefore possible to increase the capacity change rate (which depends on the distance between the movable electrode 6 and reference electrodes 4) of this variable capacitor relative to the prior art.

Figure 9:
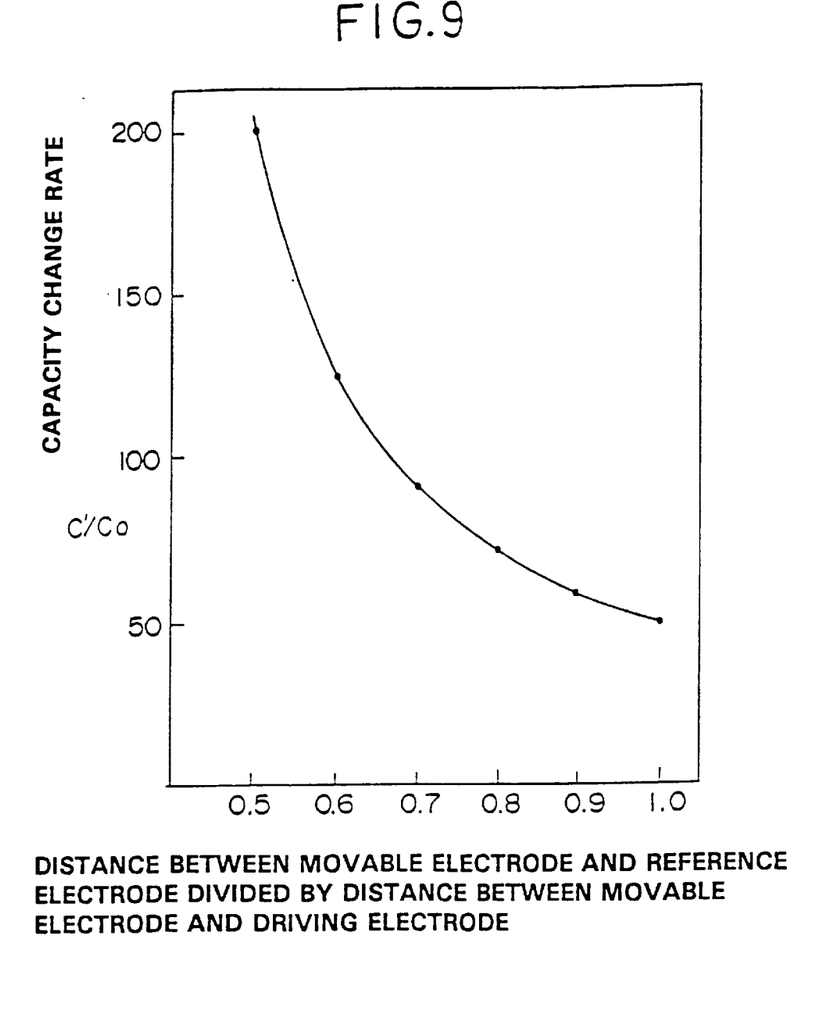
FIG. 9 is a graph showing changes in the capacity change rate in response to varying ratios of the distance between a movable electrode and a reference electrode to the distance between the movable electrode and a driving electrode.

FIG. 9 shows how the capacity change rate of the variable capacitor according to this embodiment changes depending on the distance between the electrodes by plotting the distance between the movable electrode 6 and reference electrode 4 divided by the distance between the movable electrode 6 and driving electrode 10 along the horizontal axis and by plotting the capacity change rate of the variable capacitor along the vertical axis. As apparent from FIG. 9, when the distance between the movable electrode 6 and reference electrode 4 is set at 0.5 times the distance between the movable electrode 6 and driving electrode 10, the capacity change rate is 200%. Thus, it has been proved that the present embodiment provides a capacity change rate as high as four times that of a conventional variable capacitor as shown in FIG. 18.

Further, the variable capacitor of the present embodiment can be easily fabricated using semiconductor fabrication techniques such as surface micromachining like the variable capacitor shown in FIG. 18. Therefore, it can be made compact with a reduced cost.

Further, according to the present embodiment, the capacitor 20 can play the roll of the cut-off capacitor 16 which is required in a conventional circuit (see FIG. 19) if this variable capacitor is used in the circuit configuration as shown in FIG. 2. This makes it possible to use a variable capacitor in a circuit configuration having no separate cut-off capacitor 16. As a result, a circuit configuration employing a variable capacitor can be simplified, which reduces the cost associated with the use of a variable capacitor.

(e) Fifth Embodiment

Figure 10:
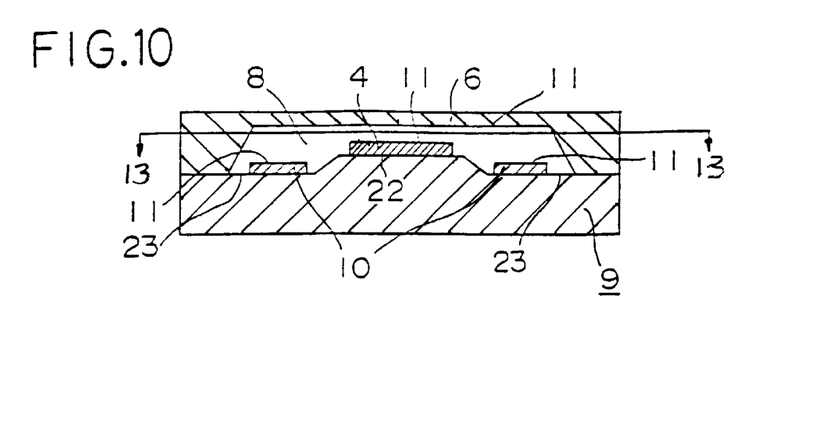
FIG. 10 is a vertical sectional view of a major part of a fifth embodiment of a variable capacitor according to the present invention.

FIG. 10 is a vertical sectional view showing the configuration of a major part of a fifth embodiment of a variable capacitor according to the present invention. The reference electrode 4 is formed in the center of the insulating support base 9 and the driving electrode 10 is disposed on opposite sides of the reference electrode 4. Further, a raised portion 22 is formed in the center of the insulating support base 9 relative to the flat portions 23 formed on opposite sides of the raised portion 22. The configuration of the present embodiment is otherwise the same as the fourth embodiment and, hence, its description will be omitted.

The present embodiment operates similarly to the fourth embodiment and provides the same advantages.

(f) Sixth Embodiment

Figure 11:
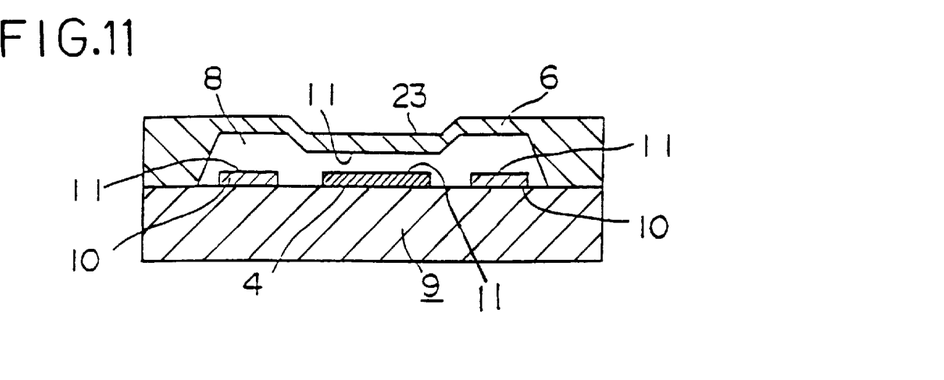
FIG. 11 is a vertical sectional view of a major part of a sixth embodiment of a variable capacitor according to the present invention.

FIG. 11 is a vertical sectional view showing the configuration of a major part of a sixth embodiment of a variable capacitor according to the present invention. The feature of the present embodiment that differentiates it from the fifth embodiment is that the insulating support base 9 is formed so that it has a flat surface on which the reference electrode 4 and driving electrodes 10 are formed and in that the movable electrode 6 is formed with irregularity which makes the gap between the movable electrode 6 and driving electrode 10 greater than the gap between the movable electrode 6 and reference electrode 4. In this embodiment, a concave portion 23 is formed in the center of the movable electrode 6 to make the gap between the movable electrode 6 and reference electrode 4 smaller than the gap between the movable electrode 6 and the driving electrode 10. The configuration of the present embodiment is otherwise the same as the fifth embodiment and, hence, its description will be omitted.

The present embodiment operates similarly to the fourth and fifth embodiments and provides the same advantages.

(g) Seventh Embodiment

Figure 12:
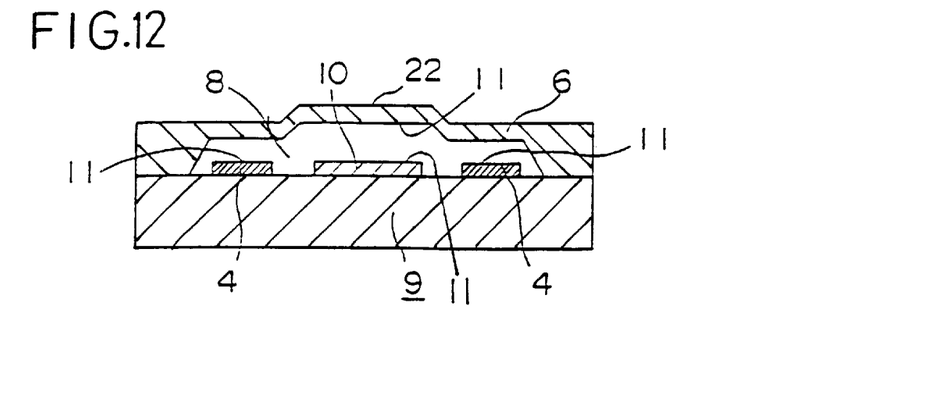
FIG. 12 is a vertical sectional view of a major part of a seventh embodiment of a variable capacitor according to the present invention.

FIG. 12 is a vertical sectional view showing the configuration of a major part of a seventh embodiment of a variable capacitor according to the present invention. In this embodiment, the driving electrode 10 is formed in the center of the flat upper surface of the insulating support base 9; the reference electrode 4 is formed on opposite sides of the driving electrode 10; and the movable electrode 6 is formed with a raised portion 22 in the center thereof.

The configuration of the present embodiment is otherwise the same as the sixth embodiment and, hence, its description will be omitted. The present embodiment operates similarly to the sixth embodiment and provides the same advantages.

(h) Eighth Embodiment

Figure 13:
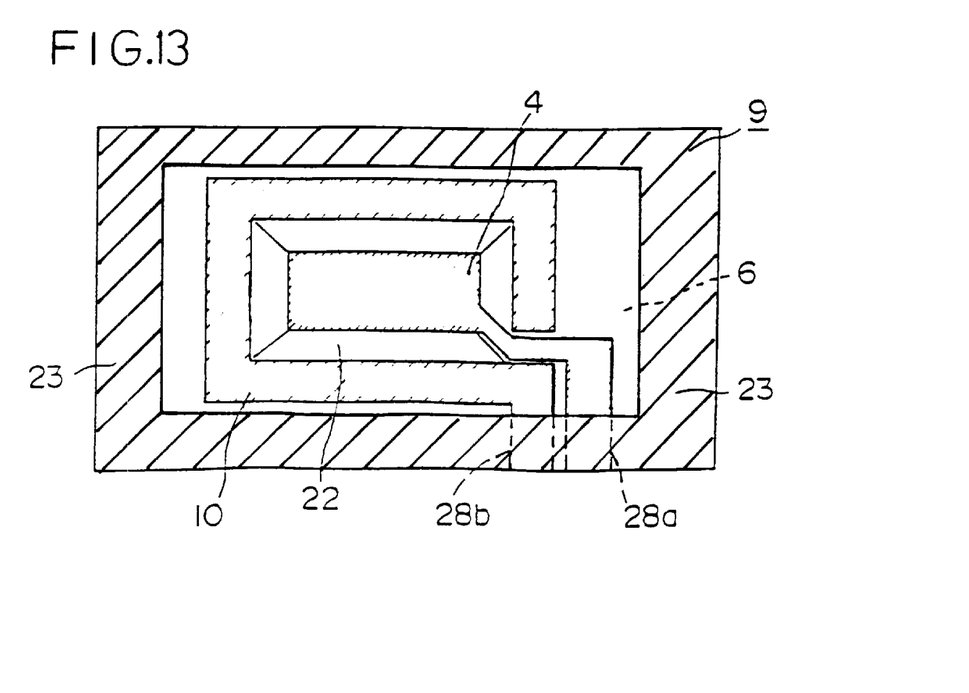
FIG. 13 is a horizontal sectional view of a major part of a eighth embodiment of a variable capacitor according to the present invention.

FIG. 13 shows the configuration of a major part of an eighth embodiment of a variable capacitor according to the present invention. The present embodiment has the same vertical section as that of the fifth embodiment shown in FIG. 10. FIG. 13 is a horizontal sectional view taken along the line 13—13 in FIG. 10. In this embodiment, the insulating support base 9 is formed to have a configuration wherein a raised portion 22 formed in the center of the insulating support base 9 is surrounded by a raised portion 23; the reference electrode 4 is formed on the raised portion 22; and the driving electrode 10 is formed so as to surround the reference electrode 4. The terminal portions 28*a* and 28*b* of the reference electrode 4 and driving electrode 10, respectively, are led out on one side of the insulating support base 9.

The configuration of the present embodiment is otherwise the same as the fifth embodiment and, hence, its description will be omitted. The present embodiment operates similarly to the fourth through seventh embodiments and provides the same advantages.

Further, in this embodiment, only one terminal portion 28*a* and only one terminal portion 28*b* for the reference electrode 4 and driving electrode 10, respectively. This arrangement is more preferable in simplifying the terminal portion 28 and therefore the configuration of the device than the first through fourth embodiments wherein either the reference electrode 4 or driving electrode 10 is formed as two separate electrodes.

(i) Ninth Embodiment

Figure 14A:
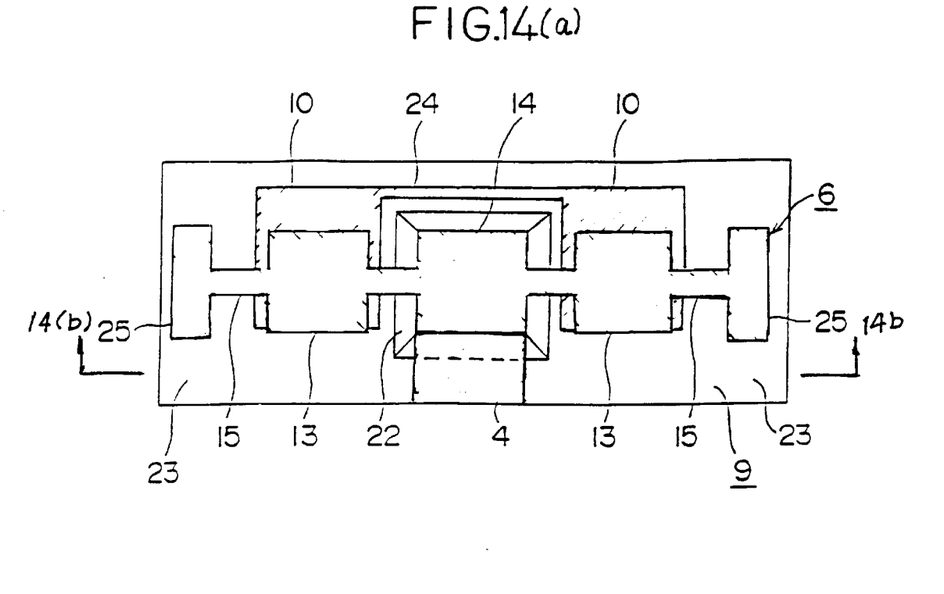
Figure 14B:
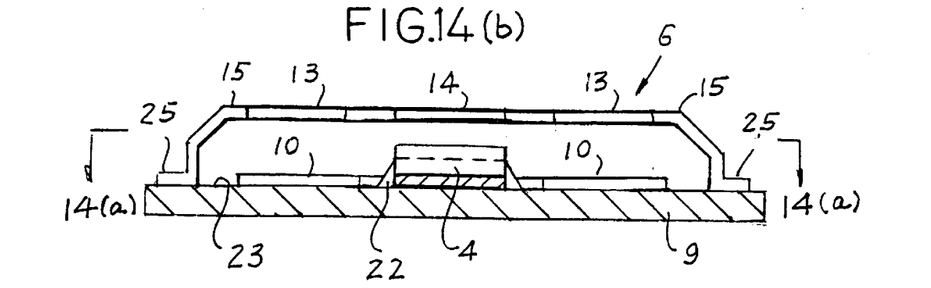
Figure 16:
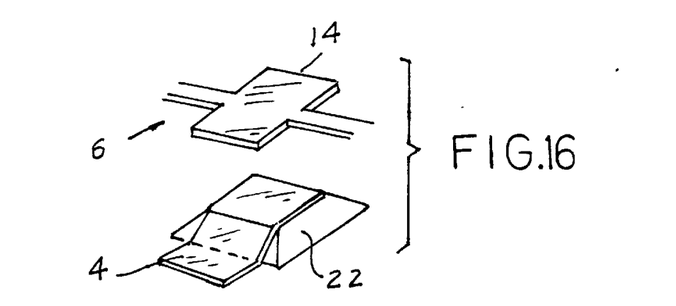
FIG. 16 is an isometric detail view showing a portion of the reference electrode and the movable electrode of the ninth embodiment of FIGS. 14($a$) and 14($b$).

FIGS. 14(*a*), 14(*b*) and 16 show the configuration of a major part of a ninth embodiment of a variable capacitor according to the present invention. This embodiment is similar to the eighth embodiment in that a raised portion 22 is formed in the center of the insulating support base 9 and a flat portion 23 is formed around the raised portion 22.

The reference electrode 4 is formed to extend from the convex portion 22 down to the front portion of the flat portion 23, and the driving electrode 10 is formed on the flat portion 23 on both sides of the reference electrode 4. The driving electrode 10 has two main sections which are connected to one another through a beam portion 24.

The movable electrode 6 includes support portions 25 and electrode portions 13 and 14 which are connected together by a moveable beam portion 15. A central electrode portion 14, coupled to the beam 15, faces the reference electrode 4. A pair of side portions 13, coupled to the beam 15, face the two main sections of the driving electrode 10. The movable electrode 6 is supported on the insulating support base 9 at its support portions 25.

The present embodiment having the above-described configuration operates similarly to the fourth through eighth embodiments and provides the same advantages. Since the driving electrodes 10, located on opposite sides of the reference electrode 4 are integrally formed using the beam portion 24, it is possible to simplify the formation of the driving electrode 10 and terminal connection for applying a driving voltage (external bias voltage) to the driving electrode 10. Thus, the present embodiment also makes it possible to provide a device having a simple configuration.

Further, the present embodiment employs a unique configuration wherein portions 13 and 14 of the movable electrode 6 are supported by the beam portion 15. As a result, elastic deformation of the beam portion 15 greatly facilitates the displacement of the movable electrode 6 when the driving voltage is applied to the driving electrode 10. This makes it possible to decrease the driving voltage applied to the driving electrode 10 for causing the displacement of the movable electrode 6. Thus, the capacity of a capacitor formed by the movable electrode 6 and reference electrode 4 can be varied through the displacement of the movable electrode 6 which is achieved by a low voltage.

The present invention is not limited to the above-described embodiments, and there are various possible modes of implementation. For example, in the first embodiment, the movable electrode 6 has a dual support beam structure wherein it is fixed to both sides of the opening of the concave portion 8 at both ends thereof. Alternatively, the movable electrode 6 may be supported by a cantilever beam to be disposed so that it overlaps with the reference electrode 4 and driving electrode 10. Further, the movable electrode 6 may be supported at a plurality of points on the periphery thereof.

Figure 15:
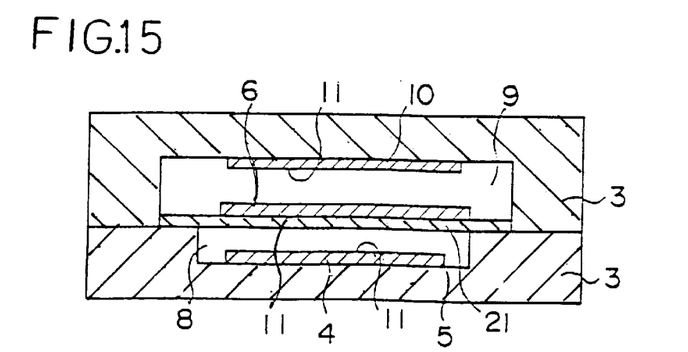
FIG. 15 is a sectional view of a major part of another embodiment of a variable capacitor according to the present invention.

As shown in FIG. 15, for example, the movable electrode 6 may be formed on the front or rear side of a ceramic beam 21 which is a silicon membrane (thin film) or the like, supported on the substrate 3 at both ends thereof.

When the movable electrode 6, reference electrode 4, and driving electrode 10 are formed as electrodes in the form of comb teeth as in the second and third embodiments, there is no limitation on the number and intervals of the comb teeth 13, 14, and 24 of the movable electrode 6, reference electrode 4, and driving electrode 10, respectively, and a plurality of combs may be formed as needed.

Further, although an insulation film is formed on the surfaces of the electrode faces 11 of the driving electrode 10, movable electrode 6, and reference electrode 4 in the above-described embodiments, such an insulation film may be deleted. In such a case, the bias voltage applied to the movable electrode 6 and driving electrode 10 are adjusted so that the electrode 11 faces will not contact with each other.

In the above-described embodiments, the movable electrode 6, reference electrode 4, and driving electrode 10 are all preferably constituted by an aluminum electrode formed by means of aluminum deposition. However, there is no limitation on the material, size, shape, and method of formation of those electrodes 4, 6, and 10, and such factors may be appropriately selected.

In the first, second, and third embodiments, the substrate 3 has been described as being made of silicon. However, the substrate 3 is not limited to a silicon substrate, and it may be a substrate constituted by an insulator such as a glass substrate. It is also possible to use a substrate having an insulation film formed on the surface thereof, e.g., a silicon substrate having a silicon oxide film or silicon nitride film formed on the surface thereof.

Moreover, although the distance between the driving electrode 10 and movable electrode 6 is greater than the distance between the movable electrode 6 and reference electrode 4 in the above-described embodiments, the distance between the driving electrode 10 and movable electrode 6 may be smaller than the distance between the movable electrode 6 and reference electrode 4. In this case, although the range of the displacement of the movable electrode 6 becomes small, the reduced distance between the driving electrode 10 and movable electrode 6 allows the movable electrode 6 to be displaced by a voltage lower than that in the prior art. The displacement of the movable electrode 6 by such a low voltage makes it possible to vary the electrostatic capacity across the movable electrode 6 and reference electrode 4 using a low voltage. This allows a reduction in the cost associated with the use of a variable capacitor.

In addition, although the driving electrode 10 is disposed on the side of the movable electrode 6 supported on the substrate 3 at an interval from the movable electrode 6 in the above-described embodiments (see FIG. 3 and FIG. 6), the driving electrode 10 may be disposed on the side of the reference electrode 4 at an interval from the movable electrode 6. In this case, the distance between the movable electrode 6 and driving electrode 10 must be different from the distance between the movable electrode 6 and reference electrode 4.

In the ninth embodiment, the movable electrode 6 is formed with a unique configuration having portions 13 facing the driving electrode, a portion 14 facing the reference electrode, and a beam portion 15. However, the movable electrode 6 may be in the form similar to that of the movable electrodes in the fourth through eighth embodiments.

Figure 17:
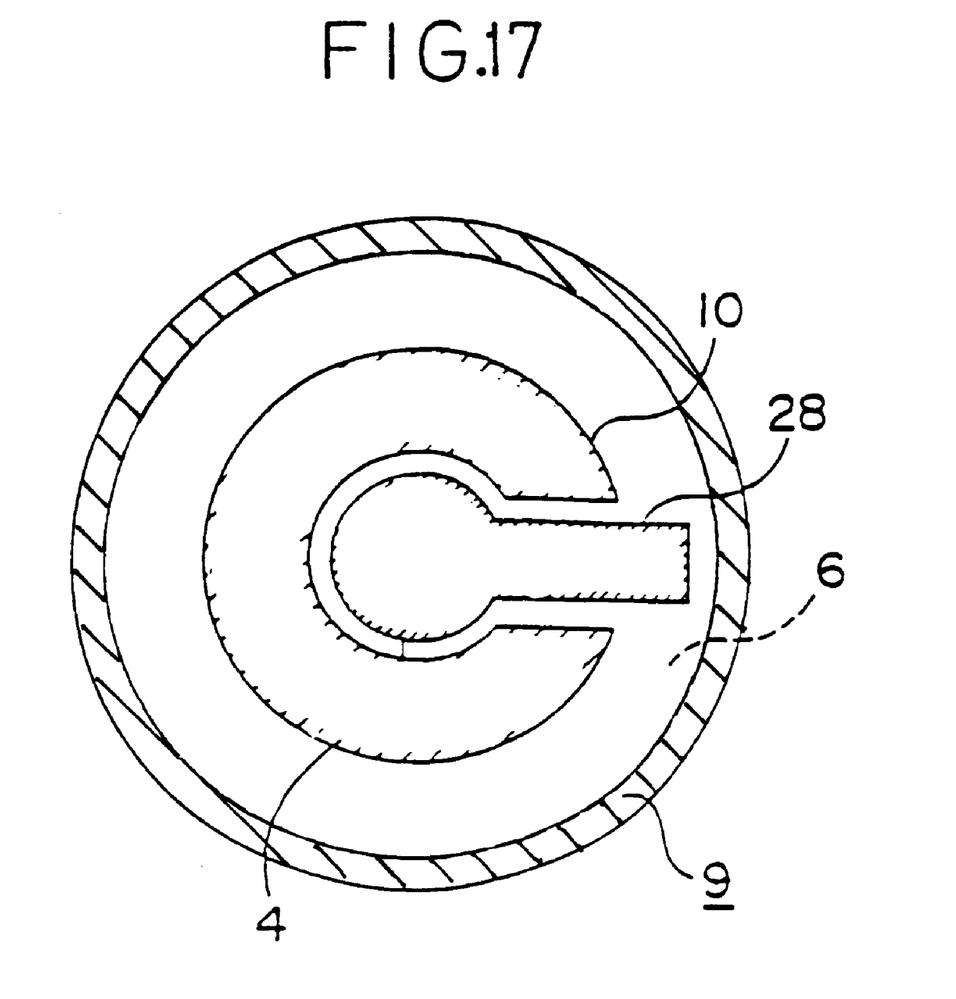
FIG. 17 is a horizontal sectional view of a major part of an eleventh embodiment of a variable capacitor according to the present invention.

In fourth through ninth embodiments, the insulating support base 9 is a base having a rectangular section, and the electrodes 4, 6, and 10 are also formed to have a rectangular portion. For example, as shown in FIG. 17, the sectional shape of the insulating support base 9 may be circular, and the electrodes 4, 6, and 10 may be formed into other shapes, for example, circular shapes, circular shapes with notches, and doughnut-like shapes adapted to the insulating support base 9.

Although either the insulating support base 9 or movable electrode 6 is formed in a configuration having irregularity to make the gap between the movable electrode 6 and driving electrode 10 greater than the gap between the movable electrode 6 and reference electrode 4 in the fourth through ninth embodiments, irregularity may be provided on both of the movable electrode 6 and insulating support base 9 so that the gap between the movable electrode 6 and driving electrode 10 becomes greater than the gap between the movable electrode 6 and reference electrode 4.

Further, even when the movable electrode 6 is formed in a unique configuration including portions 13 facing the driving electrode, a portion 14 facing the reference electrode, and a beam portion 15, irregularity may be provided on the movable electrode 6 and not on the insulating support base 9 to make the gap between the movable electrode 6 and driving electrode 10 greater than the gap between the movable electrode 6 and reference electrode 4. Alternatively, irregularity may be provided on both of the movable electrode 6 and insulating support base 9 so that the gap between the movable electrode 6 and driving electrode 10 becomes greater than the gap between the movable electrode 6 and reference electrode 4.

When the movable electrode 6 is formed with a unique configuration having portions 13 facing the driving electrode, a portion 14 facing the reference electrode, and a beam portion 15 as in the ninth embodiment, both of the movable electrode 6 and driving electrode 10 may be formed in a flat shape having no irregularity. In this case, the unique configuration of the movable electrode 6 as described above allows the formation of a variable capacitor in which the movable electrode 6 can be displaced using a low voltage.

Further, the gap between the movable electrode 6 and driving electrode 10 is twice the gap between the movable electrode 6 and reference electrode 4 in the above-described embodiments. However, this is not essential and it is sufficient if the gap between the movable electrode 6 and driving electrode 10 is greater than the gap between the movable electrode 6 and reference electrode 4.

Moreover, although the insulating support base 9 in the fourth through ninth embodiments is formed of glass or ceramic, the insulating support base 9 is not required to be formed of glass or ceramic and may be formed of other materials having insulating properties.

According to the present invention wherein a movable electrode is driven by a driving electrode, the range of the displacement of the movable electrode can be freely set by setting a large distance between the movable and driving electrodes to make the range of displacement of the movable electrode large and by setting a small distance between the movable and driving electrodes to make the range of the displacement of the movable electrode small. The electrostatic capacity of the capacitor can be varied by varying the distance between the movable and reference electrodes by means of the displacement of the movable electrode. For example, it is therefore possible to increase the capacity change rate of the capacitor easily by setting a large distance between the movable and driving electrodes. Further, by setting a small distance between the movable and driving electrodes conversely, a variable capacitor can be provided which requires a low voltage to be applied to the driving and movable electrodes, although the capacity change rate is small.

As described above, the present invention makes it possible to provide a variable capacitor having a great capacity change rate or a variable capacitor which can be operated with a low voltage by setting the distance between the movable and driving electrodes with flexibility depending on the specifications of the variable capacitor using semiconductor fabrication techniques and the like. It is therefore possible to provide a desired variable capacitor at a low cost.

Further, in a circuit configuration employing a variable capacitor, the present invention makes it possible to eliminate DC components from a bias voltage source for applying an external bias voltage to a variable capacitor using a capacitor constituted by the driving and movable electrodes without a cut-off capacitor which is required in conventional circuit configurations. This allows the cost of a circuit employing a variable capacitor to be reduced by the amount of such a cut-off capacitor which can be deleted.

While specific illustrated embodiments have been shown and described, it will be appreciated by those skilled in the art that various modifications, changes, and additions can be made to the invention without departing from the spirit and scope thereof as set forth in the following claims.

What is claimed is:

1. A micromachine variable capacitor comprising:

a capacitor formed by a movable electrode and a reference electrode which are spaced apart and which face one another; and a driving electrode which faces and is spaced apart from the movable electrode for driving the movable electrode when a bias voltage is applied to produce a potential difference between the movable electrode and the driving electrode, wherein the movable electrode moves in response to the bias voltage, and wherein a space between the movable electrode and driving electrode is greater than a space between the movable electrode and reference electrode.

2. A micromachine variable capacitor comprising:

a substrate;

a movable electrode supported on the substrate so that the movable electrode faces and is spaced from the substrate;

a reference electrode formed on the substrate and facing a portion of the movable electrode at a first distance therefrom, the reference electrode and movable electrode cooperating to define a capacitor; and a driving electrode formed on the substrate, independently of the reference electrode, and facing a portion of the movable electrode at a second distance therefrom which is different than said first distance, the driving electrode causing the movable electrode to move when a bias voltage is applied to produce a potential difference between the movable electrode and driving electrode, wherein the movable electrode moves in response to the bias voltage, and wherein the first distance is less than the second distance.

3. The micromachine variable capacitor according to claim 2, wherein a concave portion is formed on the substrate, and the driving electrode is provided on the concave portion.

4. The micromachine variable capacitor according to claim 2, wherein a raised portion is formed on the substrate, and the reference electrode is provided on the raised portion.

5. The micromachine variable capacitor according to claim 2, wherein the movable electrode has a concave portion which faces the driving electrode.

6. The micromachine variable capacitor according to claim 2, wherein the movable electrode has a convex portion which faces the reference electrode.

7. The micromachine variable capacitor according to claim 2, wherein the movable electrode comprises a portion facing the reference electrode, a portion facing the driving electrode, and a beam portion which is smaller in width than the portions facing the reference electrode and driving electrode.

8. The micromachine variable capacitor according to claim 1, wherein a distance between the driving electrode and the movable electrode is about twice a distance between the reference electrode and the movable electrode.

9. The micromachine variable capacitor according to claim 2, wherein the second distance between the driving electrode and the movable electrode is about twice the first distance between the reference electrode and the movable electrode.

10. The micromachine variable capacitor according to claim 2, wherein the substrate is made of silicon.

* * * * *